(12) United States Patent
Novotný et al.

(10) Patent No.: US 12,510,229 B2
(45) Date of Patent: Dec. 30, 2025

(54) LIGHT SOURCE

(71) Applicant: CRYTUR, spol. s r.o., Turnov (CZ)

(72) Inventors: Štepán Novotný, Bakov nad Jizerou (CZ); Jan Kubát, Zdar (CZ); Martin Pokorný, Karlovice (CZ)

(73) Assignee: CRYTUR, spol. s.r.o., Turnov (CZ)

( * ) Notice: Subject to any disclaimer, the term of this patent is extended or adjusted under 35 U.S.C. 154(b) by 0 days.

(21) Appl. No.: 18/034,716

(22) PCT Filed: Dec. 9, 2021

(86) PCT No.: PCT/CZ2021/050147
§ 371 (c)(1),
(2) Date: May 1, 2023

(87) PCT Pub. No.: WO2022/122058
PCT Pub. Date: Jun. 16, 2022

(65) Prior Publication Data
US 2023/0417395 A1 Dec. 28, 2023

(51) Int. Cl.
*F21V 9/32* (2018.01)
*C09K 11/67* (2006.01)
(Continued)

(52) U.S. Cl.
CPC ............. *F21V 9/32* (2018.02); *C09K 11/676* (2013.01); *C09K 11/7774* (2013.01); *F21V 29/502* (2015.01); *F21V 29/70* (2015.01)

(58) Field of Classification Search
CPC .......... F21V 9/32; F21V 29/70; F21V 29/502; C09K 11/676; C09K 11/7774;
(Continued)

(56) References Cited

U.S. PATENT DOCUMENTS

| 5,727,108 A | 3/1998 | Hed |
| 10,698,150 B2 | 6/2020 | Vrehen et al. |
| 10,746,931 B2 * | 8/2020 | Suzuki ...................... F21K 9/61 |
| 2008/0123331 A1 | 5/2008 | Schroll et al. |

(Continued)

FOREIGN PATENT DOCUMENTS

| CN | 105189698 A * 12/2015 ......... C09K 11/7774 |
| CZ | 307024 B6 11/2017 |

(Continued)

OTHER PUBLICATIONS

NPL Search Innovation Q+ (Year: 2023).*
(Continued)

*Primary Examiner* — Anabel Ton
(74) *Attorney, Agent, or Firm* — Rivka Friedman

(57) ABSTRACT

A light source using a light-converting material, in particular for the conversion of collimated or focused light, which does not operate solely on the principle of geometric concentration as known from the prior art, but which reflects light away from the interface between the surface of the conversion body (1) and the surroundings due to the high refractive index of the conversion body (1), possibly by means of an applied reflective layer. The light source uses the high refractive index and high transmittance of the phosphor material as the properties necessary to direct the light in the desired direction directly by the conversion body (1) itself. The light source emits collimated or focused intense secondary light, or a homogenised mix of primary and secondary light, or it may transmit supplementary light.

11 Claims, 13 Drawing Sheets

(51) Int. Cl.
  *C09K 11/77*   (2006.01)
  *F21V 29/502*  (2015.01)
  *F21V 29/70*   (2015.01)

(58) Field of Classification Search
  CPC ............ H10H 20/851; H10H 20/8512; H10H 20/8514; H10H 20/8515
  See application file for complete search history.

(56) References Cited

U.S. PATENT DOCUMENTS

| | | |
|---|---|---|
| 2014/0209581 A1 | 7/2014 | Pawlowski et al. |
| 2017/0068034 A1 | 3/2017 | Chang et al. |
| 2017/0241619 A1 | 8/2017 | Fidler et al. |
| 2017/0315433 A1 | 11/2017 | Ronda et al. |
| 2020/0088927 A1 | 3/2020 | Denissen et al. |
| 2023/0417395 A1* | 12/2023 | Novotný .................. F21V 9/32 |

FOREIGN PATENT DOCUMENTS

| | | | | |
|---|---|---|---|---|
| EP | 2189509 A1 * | 5/2010 | ......... | C09K 11/0883 |
| WO | WO-2018054652 A2 * | 3/2018 | ............... | F21K 9/64 |
| WO | 2020073027 A1 | 4/2020 | | |
| WO | WO-2020066077 A1 * | 4/2020 | ............. | C09K 11/02 |

OTHER PUBLICATIONS

ESPACE description translation WO2020066077 (Year: 2024).*
English Translation (Year: 2024).*
Search Report from the Industrial Property Office of the Czech Republic for Application No. PV 2020-667 mailed on May 26, 2021.
International Search Report for PCT/CZ2021/050147 mailed on Mar. 11, 2022.

* cited by examiner

LIGHT SOURCE

FIELD OF THE INVENTION

The invention relates to a light source from which light beams emitted primarily in a particular direction emerge. The light source falls within the field of light converting sources, in which primary light of given wavelengths is converted at least partially into secondary light of different wavelengths.

BACKGROUND OF THE INVENTION

Currently, there are a number of light sources working on the principle of converting primary light into secondary light, or a mix of primary and secondary light to obtain the so-called white light. Light conversion is provided by phosphor materials, which are used both in the form of single crystals and polycrystals (powders, phosphor in glass (PIG), ceramics).

One of the disadvantages of phosphor materials in common use, e.g. in white or green LED applications, is their high refractive index, which limits the amount of light that can be extracted from them. The most commonly used phosphors, YAG:Ce and LuAG:Ce, have a refractive index greater than 1.8. The limiting angle of total reflection for the phosphor-air interface is therefore about 33° from the perpendicular to the interface for both materials, so any rays incident at a higher angle are reflected back into the phosphor and not radiated out.

Wether phosphor is modelled into any body, it is always possible to define on it a so-called incident surface, on which the primary radiation is incident, and a so-called exit surface, from which the secondary radiation, or a mix of secondary and primary radiation, emerges. In some cases, the incidence and exit surfaces may overlap on the phosphor body.

A frequent disadvantage of light sources based on primary light conversion is that the secondary light usually exits the exit surface in all directions into space in accordance with Snell's law of refraction, see FIG. 1, and therefore the secondary light must be collimated into the desired direction using optical elements. The deployment of the optical elements will generally affect the size of the light source and its design complexity. This is disadvantageous, as today's era favours miniaturisation while maintaining the best possible results. Moreover, in most cases, the additional collimation added by the collimating optics leads to a loss of light rays that exit the exit face (from the exit surface) at angles that are not collected by the collimating optics (see FIG. 1), resulting in a loss of light output.

Optical components for collimation of secondary radiation can be represented in light sources by, for example, mirrors, lenses, light pipes, etc. All of these known and used solutions have in common that they complicate the design of the light source and add additional demands on the dimensional tolerances of these elements and their mutual centering.

Another possible solution to collimate secondary light, or a mix of unconverted primary light and secondary light, is the invention of WO 2017 157 742 (A1). The invention presents a light source that is assembled from a group (of an array) of basic elements. Each element comprises a primary light source, a conversion (phosphor) element and an additional parabolic concentrator. The basic arrangement of the invention describes that the conversion body and the primary light source are arranged inside a parabolic concentrator, which essentially operates as a hollow mirror that concentrates the light rays incident on its inner walls, from where the secondary light propagates already in a collimated form.

The disadvantages of the above mentioned invention are that the design of such a light source is still complex and limited by the size of the light emitting surface, and thus unsuitable for miniaturization. At the same time, a significant part of the radiation is emitted outside the focal point of the parabolic concentrator.

In another known invention described in WO 2020 073 027 (A1), a light source with collimated secondary light is solved again using a parabolic concentrator. This time the concentrator is connected at its apex to the face of the phosphor beam. The exit face of the phosphor introduces secondary light into the body of the parabolic concentrator. Compared to the above solution, it is advantageous that it is possible to manage the waste heat management on the phosphor rod, and that it is possible to pump the phosphor rod with many primary light sources through a large incident area.

The disadvantages of the invention consist in the complex construction, where three components (primary light source, phosphor, optical member—parabolic concentrator) need to be arranged. A similar solution is the invention described in US 2020/0088927 (A1), which also uses three basic components. A primary light source, a phosphor body in the form of a rod and a parabolic concentrator in the role of an optical member for collimating the secondary light. As with the previous invention, the entrance surface of the phosphor rod is fitted with an array of primary light sources, whereupon the face of the rod (the exit surface) is bonded to the parabolic concentrator.

The object of the invention is to provide a light source, in particular a collimated or focused light source, comprising an optical member and a phosphor in a single component to simplify the design of a light source suitable for applications subject to the trend towards miniaturization and exhibiting a high efficiency while being capable of operation even at high power.

SUMMARY OF THE INVENTION

The above defined problem is solved by forming a light source, in particular a collimated or focused light source, according to the following invention.

A light source, in particular a collimated or focused light source, comprises at least one primary light source. Primary light means light of a particular wavelength which will be changed to the desired wavelength in the source. The primary light source may be, for example, one or more laser diodes (LDs) or light-emitting diodes (LEDs). Further, the source comprises at least one conversion body which is at least partly formed from a material for converting the primary light into secondary light, i.e. the so-called phosphor material. The conversion body comprises a phosphor material which alters the parameters of the primary light entering its volume. The secondary light is therefore light with different parameters from the primary light. If the conversion of the primary light is not complete, a mixture of primary and secondary light emerges from the conversion body. The conversion body has on its surface at least one incident surface for primary light and at least one exit surface for secondary light, or for a mix of primary and secondary light. As can be inferred from the names of the surfaces, the incident surface serves to impinge the primary light and to allow it to penetrate the volume of the conversion body. The exit surface is used to leak light away from the conversion body.

The subject matter of the invention consists in that the area of the incident surface is smaller than the area of the exit surface. This is an important technical feature, since the conversion body does not serve as the well-known optical member of geometric concentration, in which the primary light from a large incident surface is converted into a small exit surface, thereby ensuring the intensification of the secondary light. Instead, the invention operates with a smaller incident surface whereby light is converted in a converting member, where the light converts, is then reflected and exits the converting member as an intense collimated, homogenized, or focused beam once it reaches the exit surface. For multiple internal reflection of light within the conversion body, the remaining surface of the conversion body forms a reflective interface.

Advantages of the invention include making use of the conversion body through a small input area, which facilitates the supply of primary light in the light source as well as subsequent collimation or focusing of secondary light, or a mix of primary unconverted light and secondary light. Optionally, it is advantageous if the input surface is either polished, ground, defined structured or provided with an anti-reflective coating to increase the efficiency of the input of the primary light. It is further advantageous that the light exits the exit surface in the desired direction and therefore the light source has a high luminous intensity and efficiency compared to conventional light sources, as the light rays do not escape in directions from which they could not be intercepted, see FIG. 2 and its comparison with FIG. 1.

Another advantage of the invention is the absence of the need to use multiple optical elements in the subsequent optical system, since the conversion body performs, in addition to the function of converting primary light to secondary light, the function of effectively directing the light in the desired direction, its collimation, or focusing, and mixing (homogenization—both intensity and color). The use of the component thus invented increases the overall system integration and efficiency of the light source.

However, the above advantages of the invention do not preclude the integration of other optical elements, such as lenses, holographic optics, polarizing filters, apertures, masks, Fresnel lenses, or light guides, which further shape the light beam. Due to the high directivity of the light emerging from the phosphor according to the invention, it is possible to use smaller optical elements or to reduce their number. For example, in LED data projectors, each LED is provided with a pair of couplers to form a collimated beam. These components may additionally be used in the mechanical construction of the light source, where they may be used to hold/press the phosphor.

It is advantageous to use the invention with optical fibers and light guides, since due to the low divergence of the light beams and the high power density emanating from the output area, the efficiency of the coupling of this light into the fiber or light guide is high, especially when compared to LEDs and other incoherent radiation sources. In addition, the light guide can further homogenize, mix or shape the light beam profile as required—e.g. for uniform illumination of slits in analytical instruments.

In preferred embodiments of the invention, the remaining surface of the conversion body is provided with a reflective layer, or the conversion body is formed of a high refractive index material to achieve total reflection. Thus, the reflective property of the interface may be induced either by the application of the reflective layer or may be caused by the physical properties and geometry of the conversion body itself. Both possibilities expand the range of variations of the conversion body, either in shape or material.

In a preferred embodiment of the light source according to the invention, the size of the incident surface is less than 2 mm$^2$. The small incident surface is conducive to miniaturization of the light source, since the output area may be in unit multiples of mm$^2$. This size of the incident area is sufficient to pump an intense beam of primary light, whereby the overall size of the light source may be reduced, either by reducing the apparatus for pumping the primary light or by miniaturizing the conversion body.

It is advantageous to embody the source according to the invention in which the conversion body as a whole is simultaneously formed of two parts, wherein the two parts are arranged in a row one after the other along the direction of the optical axis of the conversion body, in any order, wherein one part is formed of a phosphor material for partial or complete conversion of the primary light and the other part is formed of a non-phosphor material for homogenization or focusing or collimation of the light.

It turned out that both variants of arrangement of the phosphor material and non-phosphor material have their advantages. If the non-phosphor part is first, it serves to further focus the primary beam and thus improve the directionality of the secondary light and therefore increase efficiency. If the non-phosphor part is second, it will improve homogeneity, collimation or focusing when using minor portion of phosphor material.

The non-phosphor material may be in particular a single crystal, ceramic or glass ceramic, preferably of similar composition as the phosphor part, but also common materials for the production of optical components, in particular glass, cubic zirconia $ZrO_2$, silicones, PMMA, or polycarbonate. In addition to the conventional method of bonding optical components, bonding, fusing, diffusion bonding, sintering and other processes known to those skilled in the art may be used.

Preferably, the conversion body may include at least two phosphor materials for mixing the secondary light beams into the resulting light colour. The combination of the two light converting materials allows for a high quality "white" or other light to be obtained. The shape of the converter, in addition to efficient conversion, ensures that the light is directed in the desired direction and homogenised.

In a preferred embodiment of the source according to the invention, the phosphor material of the conversion body is from the group of garnets described by the formula $(A1-x, Bx)_3Al_5O_{12}:Ce^{3+}$, or from the group of perovskites $AAlO_3:Ti^{3+}$, wherein: A and B is at least one chemical element from the group Lu, Y, Gd, Mg, Tb and x takes a range between 0 and 1. Alternatively, the material of the composition $Al_2O_3:Ti^{3+}$. The above materials are suitable candidates in terms of physical properties, in particular in terms of light transmission, conversion efficiency, suitable excitation and emission spectra, high refractive index, thermal conductivity and mechanical resistance.

It is known that small internal light scattering in the volume of the phosphor is also disadvantageous in LED applications, which makes the use of powder layers or granular, and thus more scattering, glass-ceramics more advantageous for LEDs, but here in the invention it is the small or no light scattering in the phosphor material that is advantageous, which is inherent in monocrystalline phosphors in particular.

A preferred embodiment of the source according to the invention includes a heat sink, the heat transfer surface of which surrounds at least a portion of the surface of the conversion body outside the incident and exit surfaces. A surface of the conversion body that does not serve as an incident or exit surface is preferably used to dissipate waste heat to a heat sink surrounding that surface. Preferably, the surface of the conversion body and the heat sink may be bonded by a heat conductive material.

Preferably, the primary light source is adapted to generate low divergence primary light. The low divergence, i.e. divergence, of the primary light beam allows for more efficient pumping into the conversion body, as the beam can be directed in such a direction, for example at a Brewster angle, that there is the least possible reflection or scattering at the interface of the two optical media. This reduces the losses in the primary beam and, in addition, the secondary light is generated in a smaller volume, leading to the possibility of miniaturising the whole device while maintaining the output light parameters (luminous intensity, luminous flux, system efficiency). In addition, this is also important for the overall efficiency—the light generated at the focus of the paraboloid then emerges as collimated. The larger the primary beam, the more divergent the secondary beam.

It is advantageous if the conversion body has a shape from the group of shapes: elliptical paraboloid, truncated elliptical paraboloid, part of an ellipsoid—in particular spherical segments, sections or layers, compound parabolic concentrator, compound elliptical concentrator, pyramid, truncated pyramid, cone, truncated cone, compound shapes formed by combining the previous ones. The shapes listed in the enumeration of possibilities meet the conditions for use in a light source according to the invention, as they exhibit a small incident surface, a large exit surface, and allow internal reflection of the coupled light, including subsequent balancing of the light in an intensely collimated or focused beam.

Further, it has been found advantageous to provide an embodiment of the invention in which the conversion body has a glass slide, or lens, or other optical element of the group consisting of a Fresnel lens, holographic optics, light guide or light guide fiber input mounted on the output surface. The conversion body is a miniature body and, in addition, has a complex shape for which a suitable holder is laboriously formed. By attaching a slide or lens, the conversion body is held by a bonded joint between the output surface and the attached component, and the edges of the slide or lens can be attached to the holders without much difficulty. A similar advantage applies to connecting the input of another optical element, including the function of the optical element itself.

Also advantageous is an embodiment of the invention in which a source of at least one supplementary light is directed onto the incident surface of the conversion body. The supplementary light passes through the conversion body only as an optical member, without being parametrically altered, and subsequently, when exported from the exit surface of the conversion body together with the secondary light, and possibly with the unconverted residual primary light, produces a final light of the desired colour or spectral characteristics.

The main advantage of the invention is that it enables the production of intense and directed secondary light by a single component, i.e., a conversion body, thereby simplifying the construction of the light source for applications requiring miniaturization, or trouble-free operation, consisting in the elimination, or at least simplification, of sensitive optical apparatus, thereby reducing the frequency of service interventions and repairs, as well as extending the lifetime of the source, and its resistance to mechanical stress. It is also advantageous that features which are typically disadvantageous in presently known phosphor applications are exploited in the invention. For use in LED sources, low refractive index would be advantageous, according to the art, for easy coupling of secondary light into air or silicon optics, but the invention uses a material having a high refractive index. At the same time, a lower light scattering in the volume of the phosphor is advantageous compared to the prior art, which makes perfectly internally permeable single crystal phosphors more efficient against granular glass ceramics.

BRIEF DESCRIPTION OF THE DRAWINGS

The said invention will be explained in more detail in the following illustrations, where.

EXAMPLES OF THE EMBODIMENTS OF THE INVENTION

It shall be understood that the specific embodiments of the invention described and illustrated hereinafter are presented for purposes of illustration and not as a limitation of the invention to the examples provided. Those skilled in the art will find or be able to provide, using routine experimentation, a greater or lesser number of equivalents to the specific embodiments of the invention described herein.

The light source according to the invention comprises two basic components. The first component is at least one primary light source. This source comprises, for example, a laser diode that can produce an intense coherent light beam with a high power density. It is desirable that the primary light source produces low divergence primary light. The skilled person selects the parameters, in particular the emission wavelength of the primary light with respect to the phosphor material of the conversion body 1 so that conversion to secondary light occurs, and at the same time with respect to whether the conversion is complete or partial, so that a mix of primary and secondary light is produced, for example to produce white light.

Figure 1:
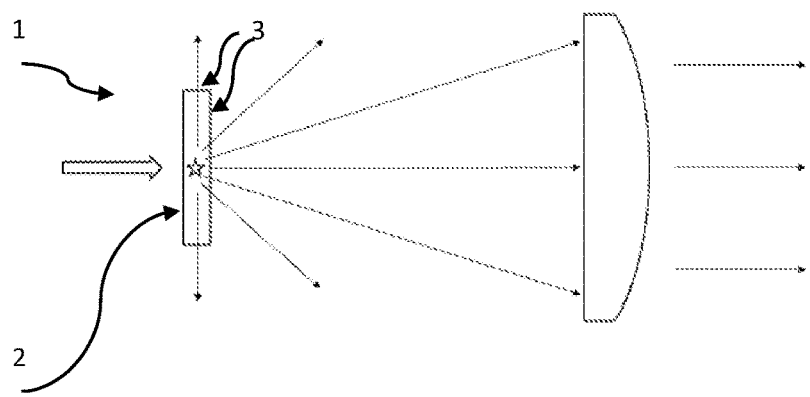
FIG. 1 shows the state of the art where the converted light is emitted from the conversion body in directions with undetectable light rays.
Figure 2:
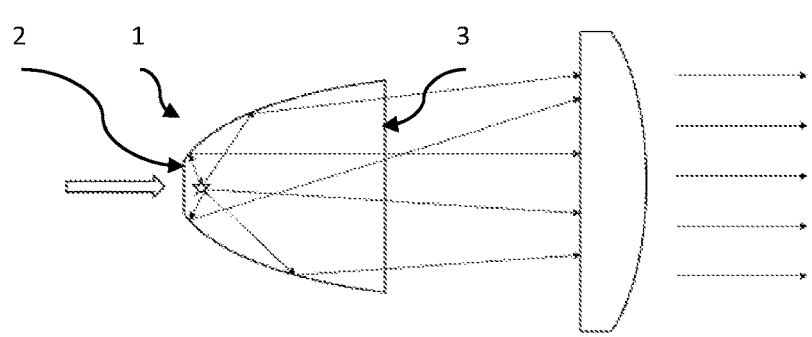
FIG. 2 shows a conversion body according to the invention, which directs the exiting light into a detectable light beam direction.
Figure 3:
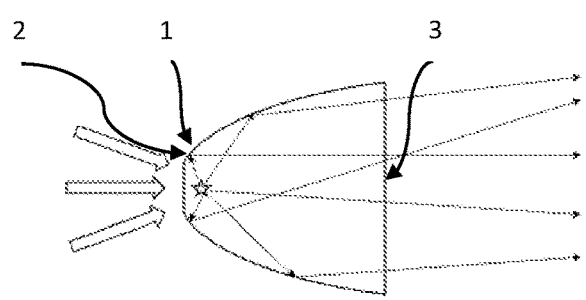
FIG. 3 shows a source conversion body pumping from multiple primary light sources.

The primary light sources have their primary light beam directed at the incident surface 2 of the conversion body 1. There may be more than one primary light source if their light beams are well focused. An example of pumping the conversion body 1 with multiple primary light beams is illustrated in FIG. 3.

It is also possible to focus a source of supplementary light on the incident surface 2. The supplementary light passes through the conversion body 1 without conversion, the conversion body 1 acts on the supplementary light only as an optical member. The supplementary light serves to mix with the secondary light produced by the conversion in the material of the conversion body 1, and possibly to mix with the unconverted portion of the primary light, to obtain a final light of the desired colour or spectral characteristics. The number of types of supplementary light is not limited in principle.

The conversion body 1 is at least partly made of phosphor material. The conversion body 1 must have a good light transmission so that the light pumped into it, together with the light generated therein, is well balanced through the exit surface 3. The primary light is pumped into the conversion body 1 through the incident surface 2, on which the primary light beams are directed. The incidence surface 2 must be smaller than the exit surface 3, whereby, in combination with the shape and role of the reflective interface of the remaining surface of the conversion body 1, the result is that the conversion body 1 does not serve as a known optical member of the geometric concentration, but that the light is converted in the conversion body 1, reflected, and as soon as it reaches the exit surface 3, it leaves it in the form of a collimated, homogenized or focused beam of high brightness. The progression of light through the conversion body 1 from the incident surface 2 to the exit surface 3 is provided by the reflection of light in the conversion body 1 from the remaining surface of the conversion body 1, which serves as a reflective interface.

The remaining surface of the conversion body 1 can obtain the reflective interface property in two ways. First, a reflective layer, such as a silver layer, is applied to the remaining surface of the conversion body 1. Alternatively, the reflective interface property may result from the material composition of the conversion body 1, in particular if it is a high refractive index material. If the difference in refractive index between the material of the conversion body 1 and the surrounding environment satisfies the condition for the existence of total reflection at the interface, then, in combination with the shape of the remaining surface of the conversion body 1 the light contained in the conversion body 1 is unable to pass through the remaining surface and is reflected towards the exit surface 3 so that the condition for total reflection is no longer satisfied at the exit surface 3.

The size of the incident surface 2 is less than 2 mm$^2$, generally the size of the incident surface 2 in the invention is about 0.05 mm$^2$. The incident surface 2 can be made this small because the primary light in the form of a laser beam can be well focused. The condition is that the material of the conversion body 1 is able to dissipate heat well from such an energy concentrated area to the rest of its volume, and that it is sufficiently heat resistant. A suitable type of material will be discussed below.

Figure 4:
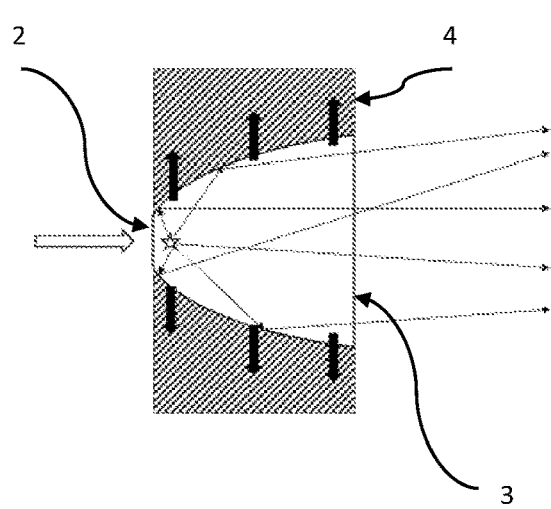
FIG. 4 shows the conversion body with the heat sink adjacent to the remaining surface of the conversion body.
Figure 5:
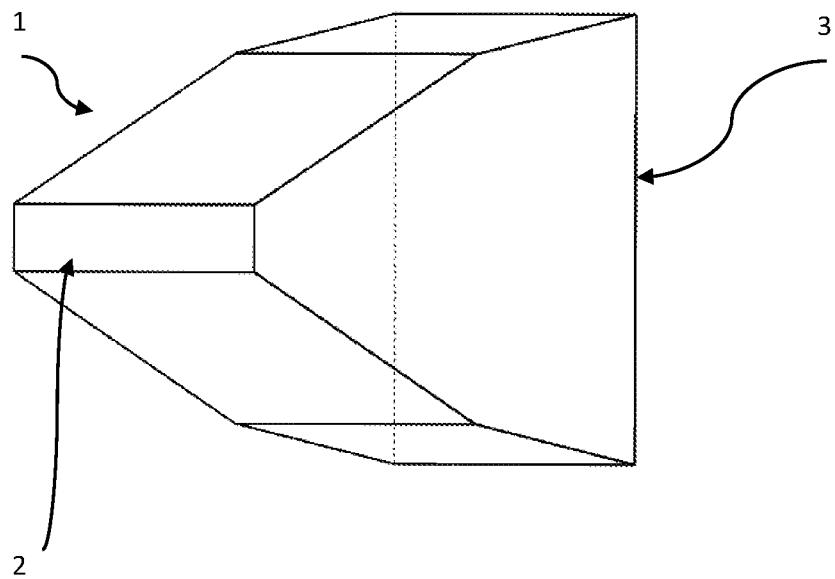
FIG. 5 shows a conversion body having the shape of a possible irregular pyramid.
Figure 6:
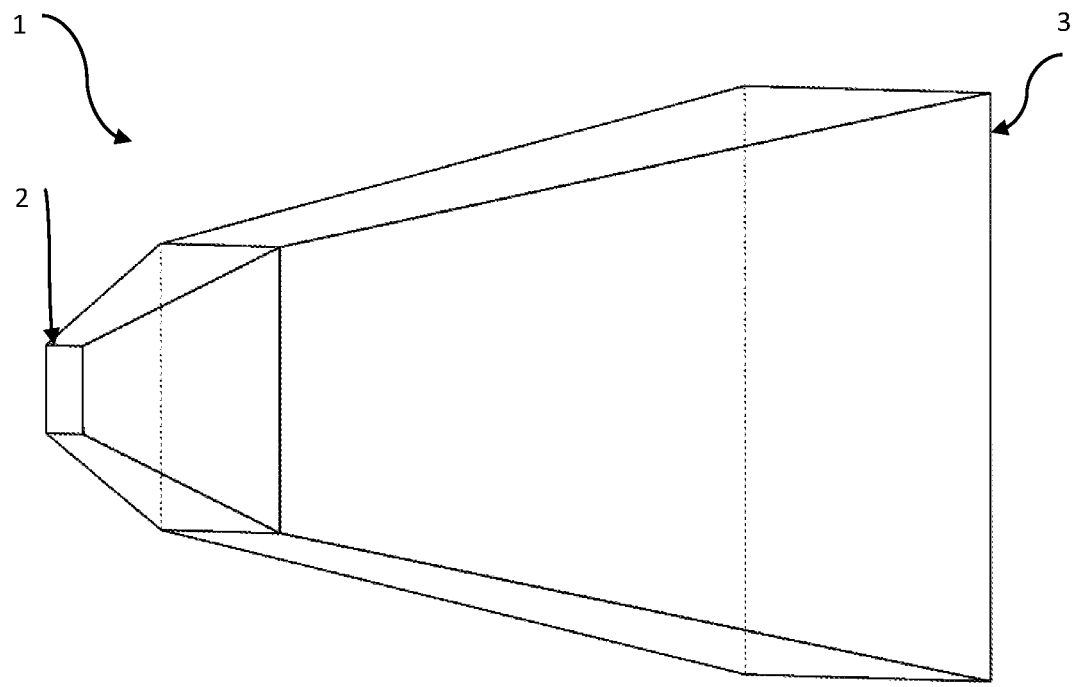
FIG. 6 shows a conversion solid having the shape of a truncated prism.
Figure 7:
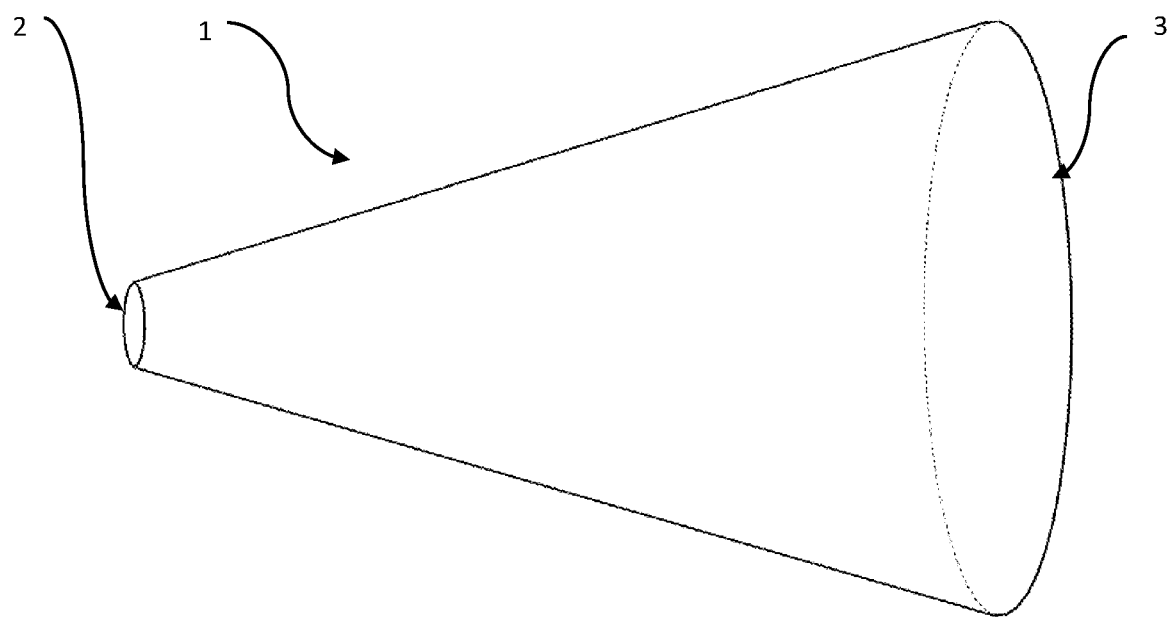
FIG. 7 shows a conversion body having the shape of a truncated cone.
Figure 8:
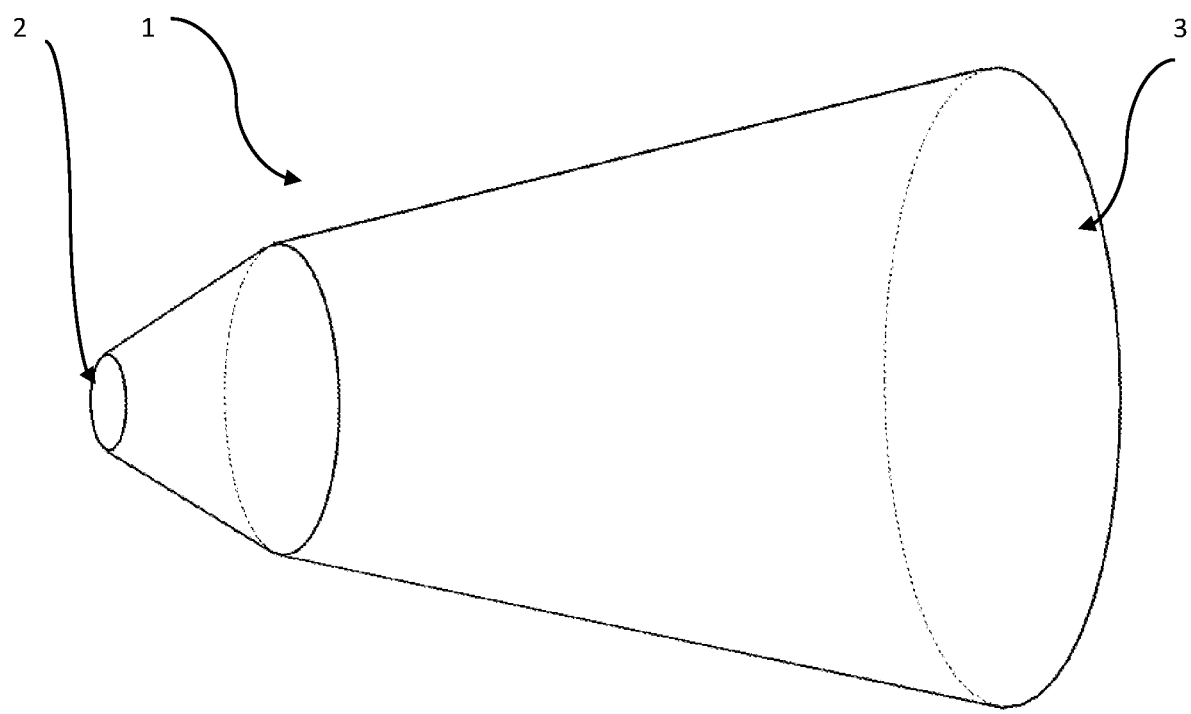
FIG. 8 shows a conversion body having the shape of another possible double truncated cone.
Figure 9:
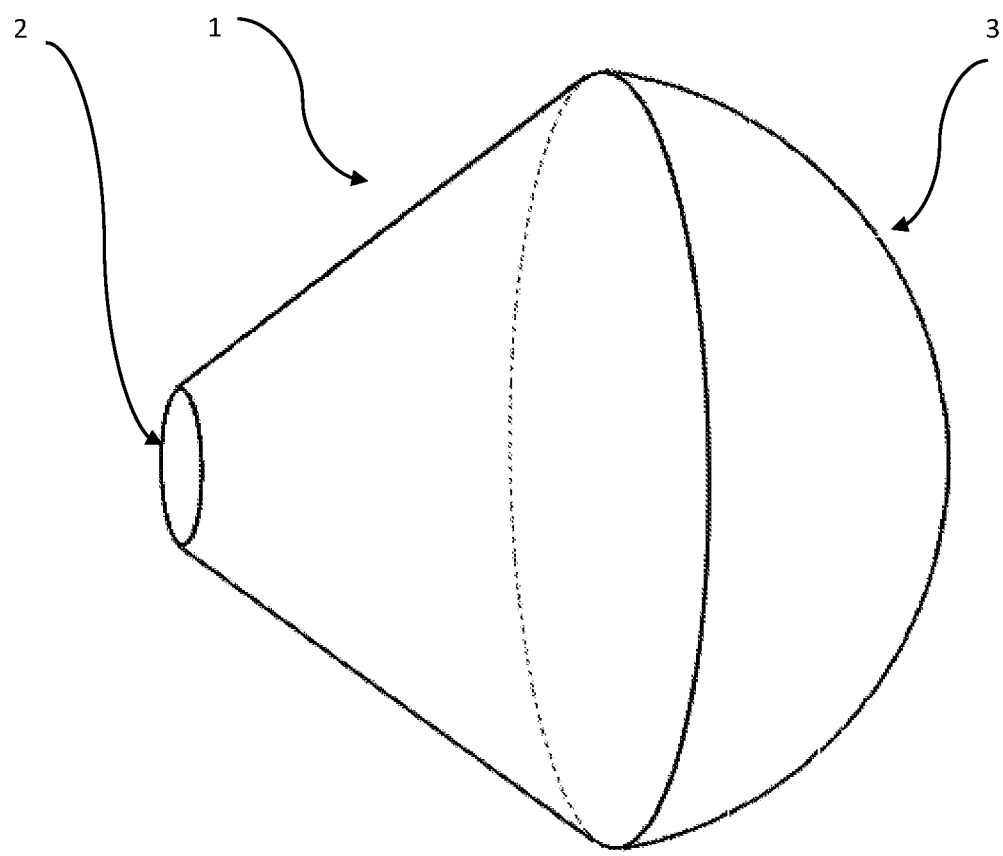
FIG. 9 shows a conversion body having the shape of a combination of a truncated cone with a spherical segment.
Figure 10:
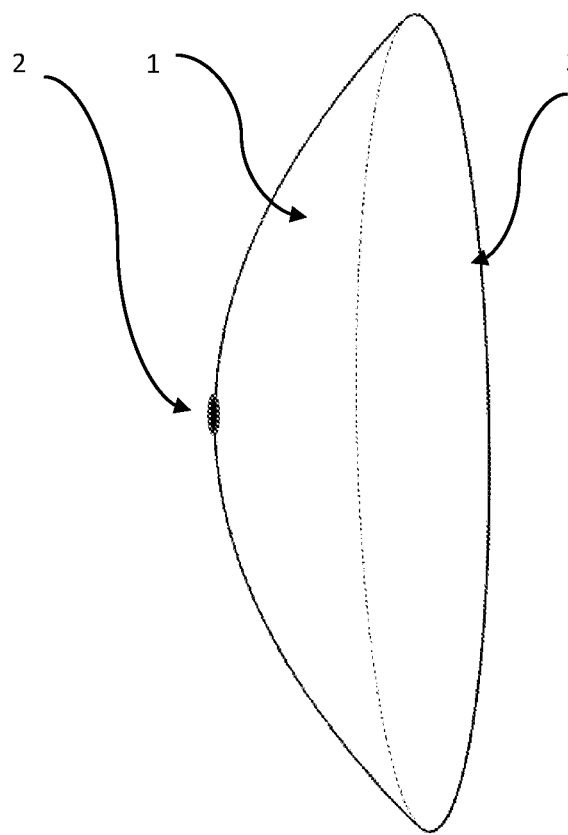
FIG. 10 shows a conversion body having the shape of a flat paraboloid.
Figure 11:
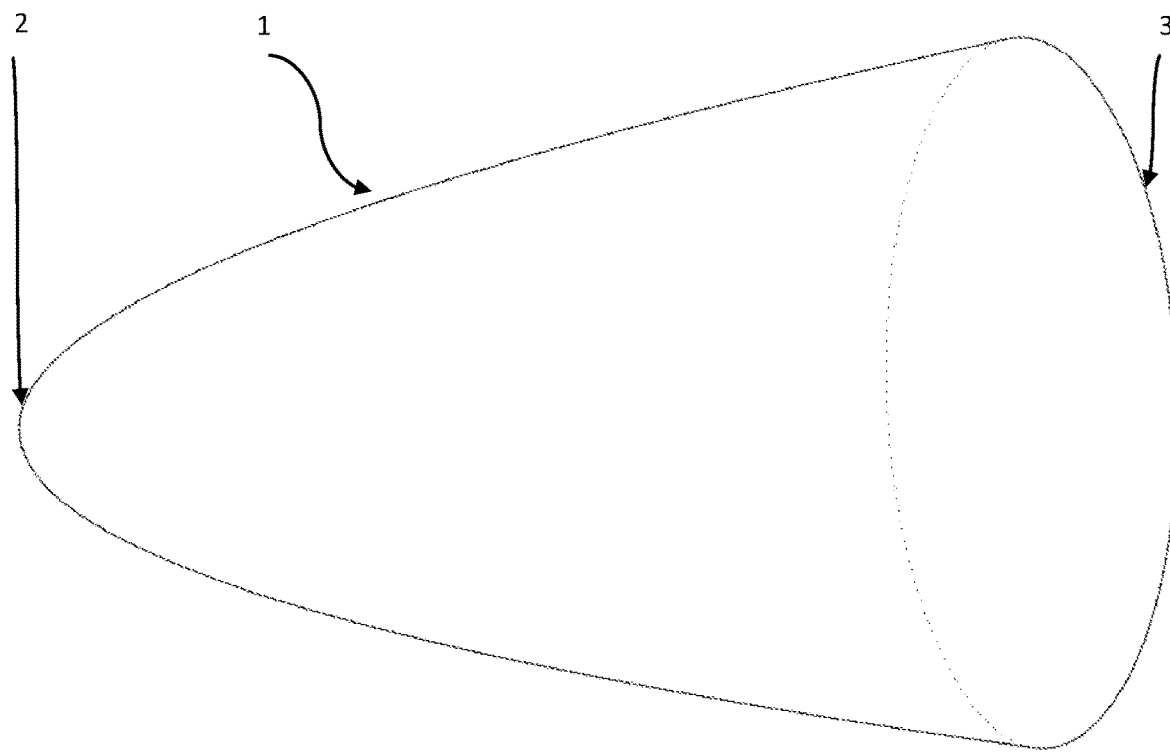
FIG. 11 shows a conversion body having the shape of a paraboloid.
Figure 12:
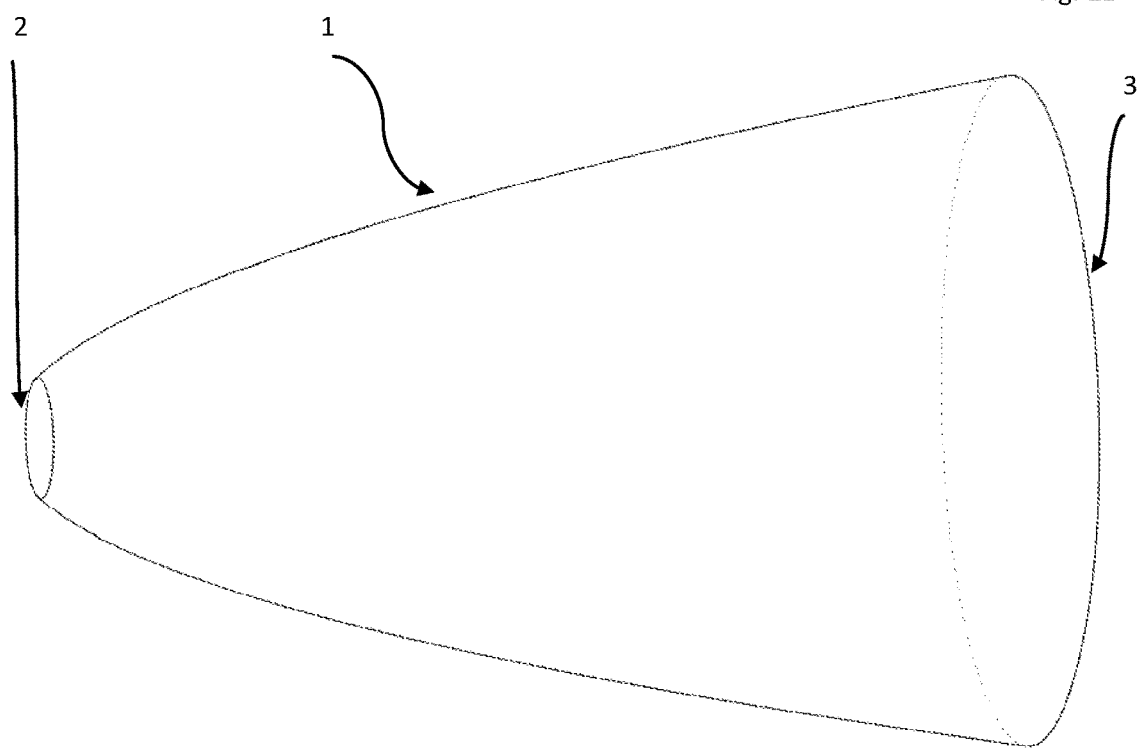
FIG. 12 shows a conversion body having the shape of a truncated paraboloid.
Figure 13:
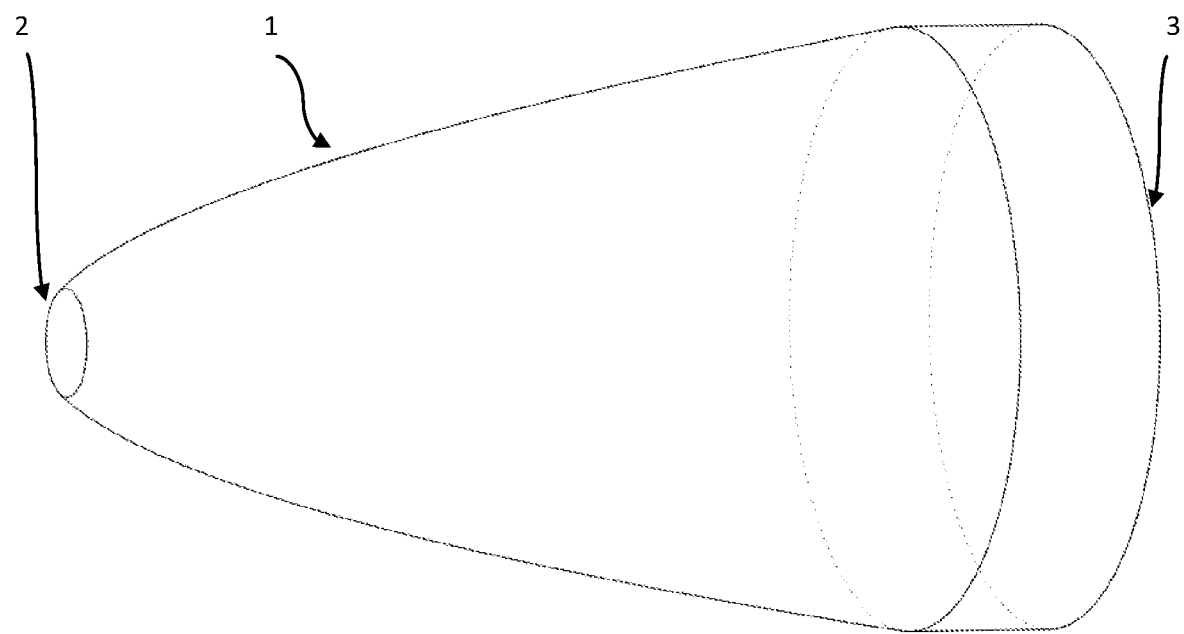
FIG. 13 shows a conversion body having the shape of a combination of a truncated paraboloid and a cylinder.
Figure 14:
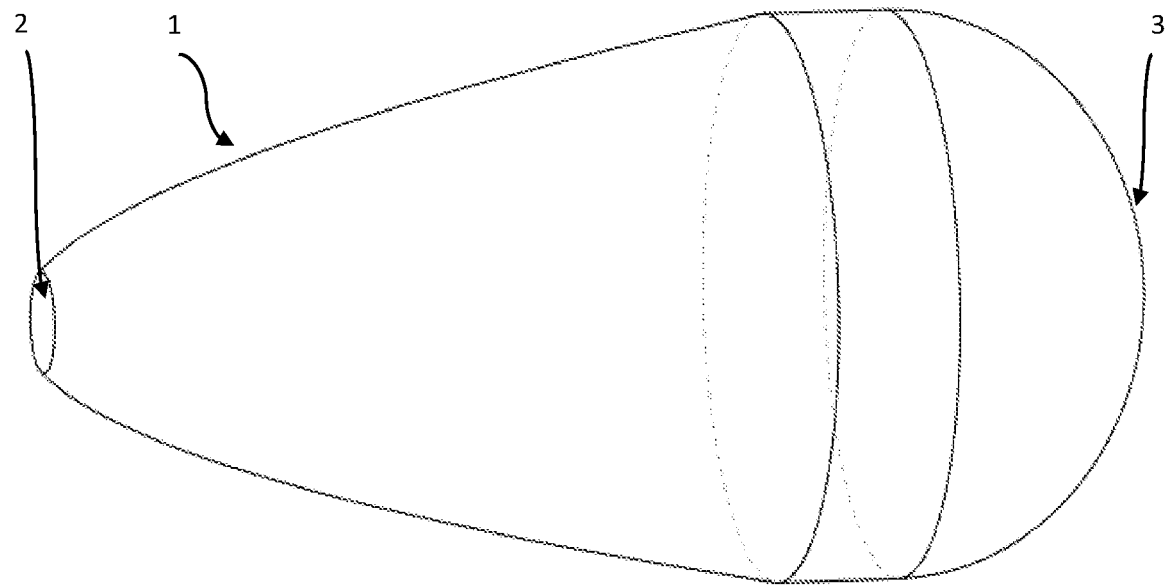
FIG. 14 shows a conversion body having the shape of a combination of a truncated paraboloid and a cylinder and a spherical segment.
Figure 15:
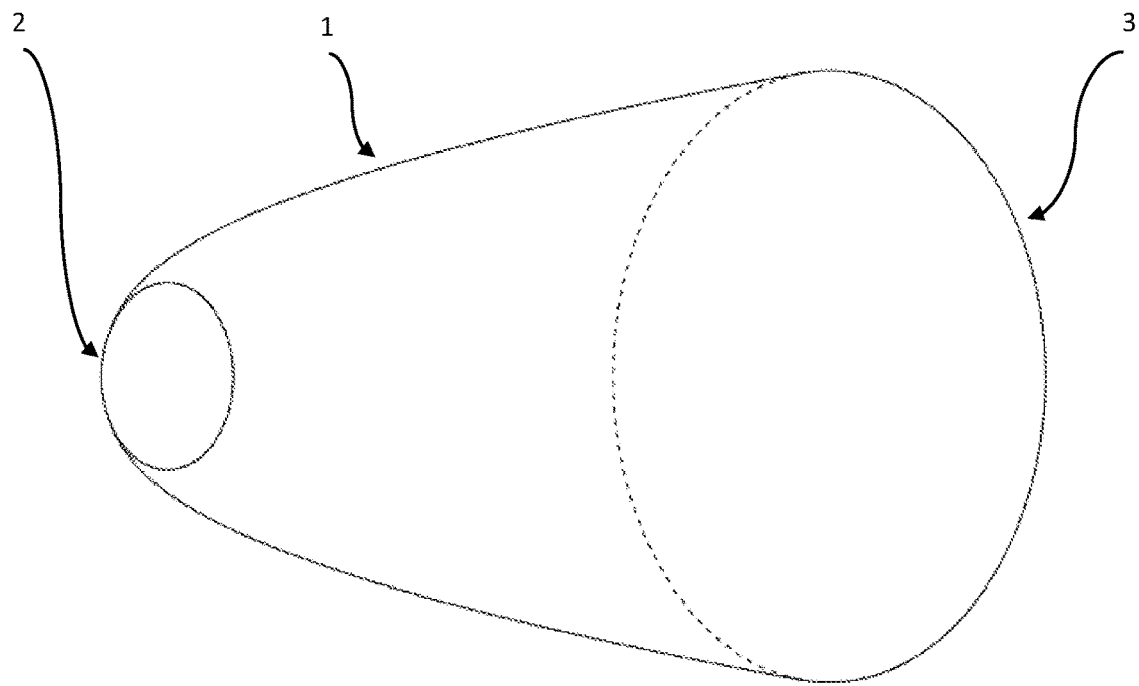
FIG. 15 shows a conversion body having the shape of a parabolic concentrator.
Figure 16:
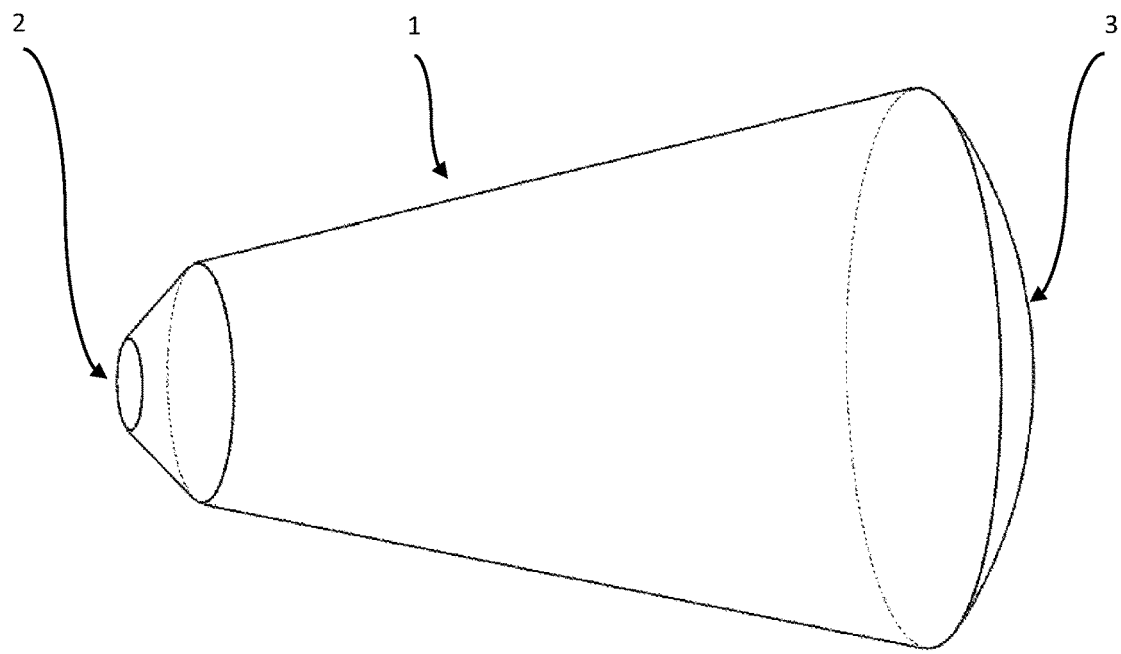
FIG. 16 shows a converse solid having the shape of a truncated cone terminated by a spherical segment.
Figure 17:
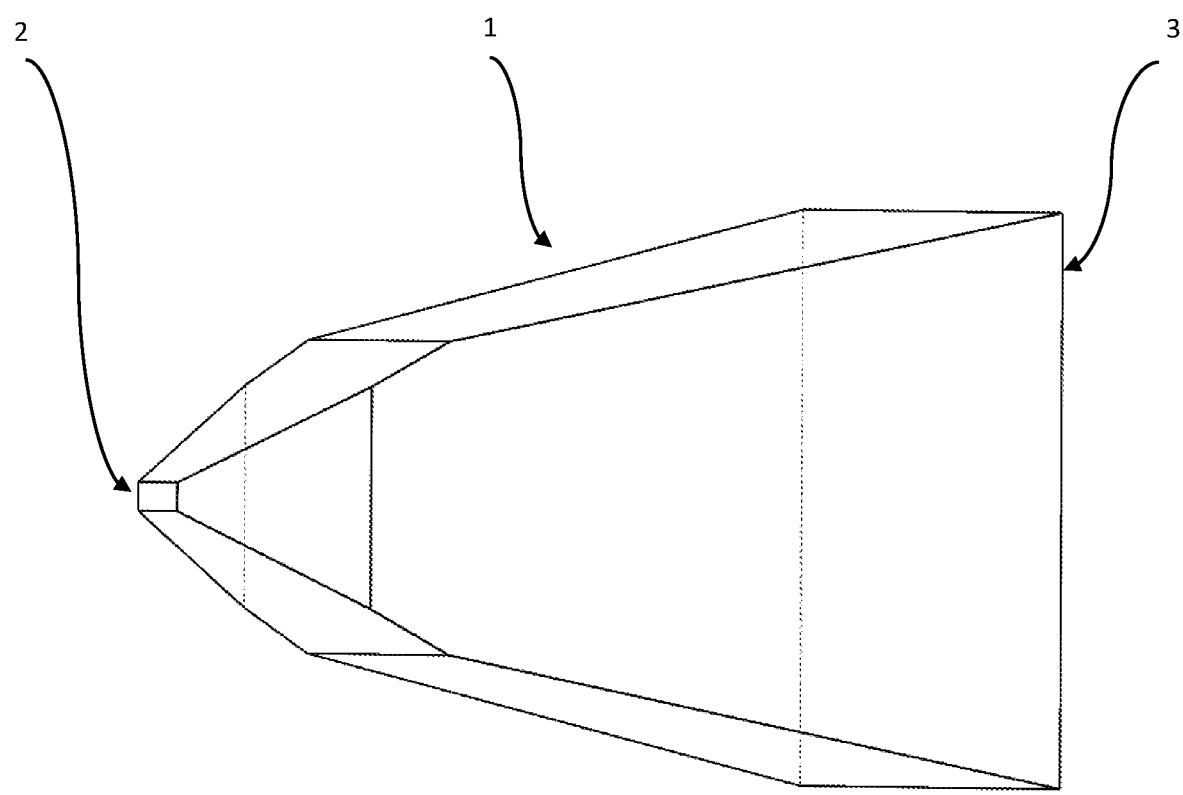
FIG. 17 shows a conversion body having the shape of an irregular cone.
Figure 18:
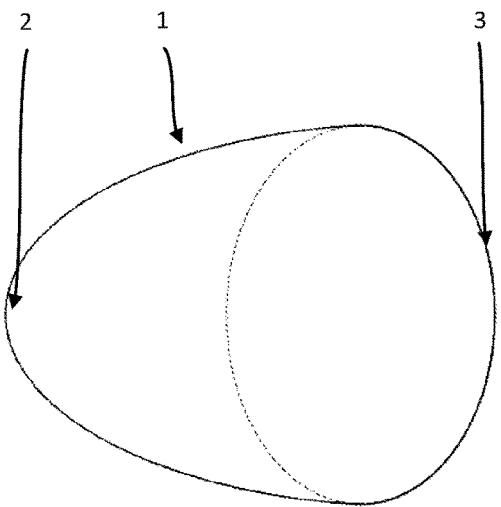
FIG. 18 shows a conversion body having the shape of an ellipsoid.
Figure 19:
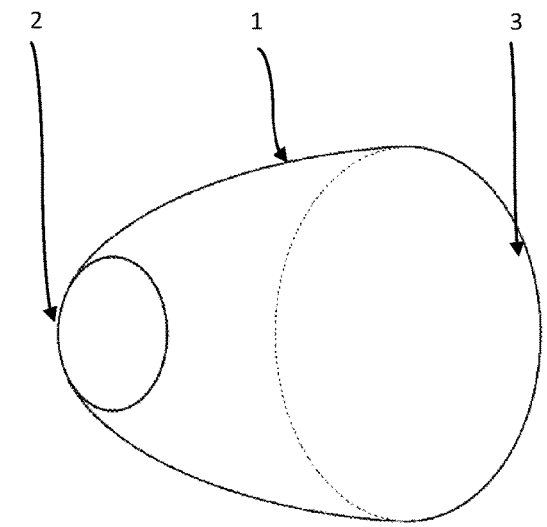
FIG. 19 shows a conversion body having the shape of another ellipsoid with a truncated tip.
Figure 20:
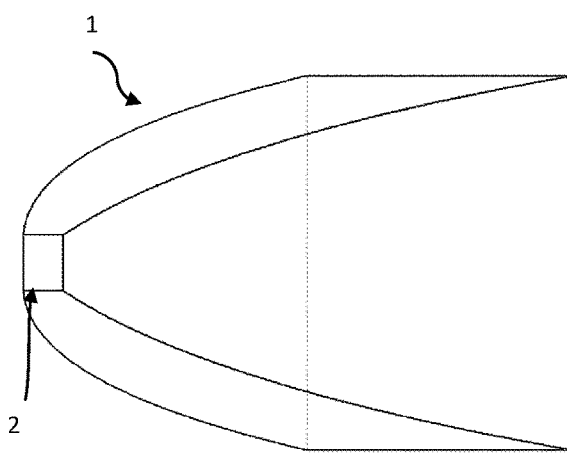
FIG. 20 shows a conversion body having the shape of a four-sided parabolic concentrator.
Figure 21:
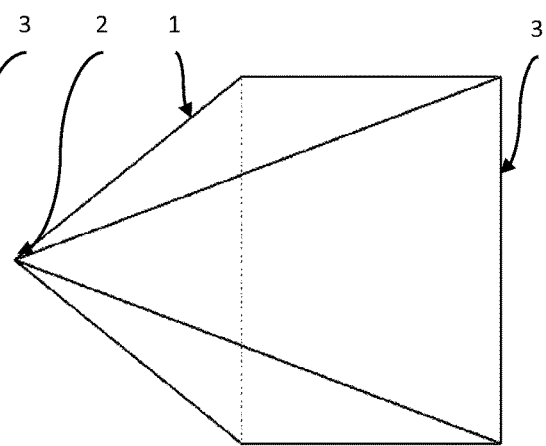
FIG. 21 shows a conversion body having the shape of a pyramid.
Figure 22:
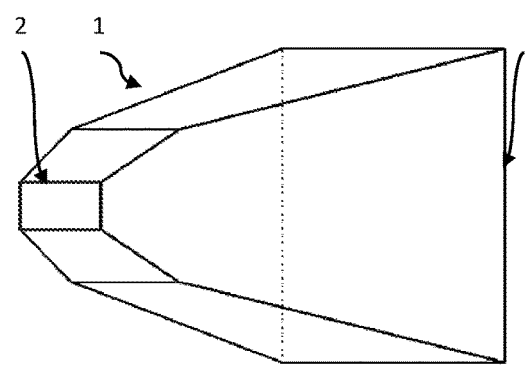
FIG. 22 shows a conversion body having the shape of another pyramid with a flat tip.
Figure 23:
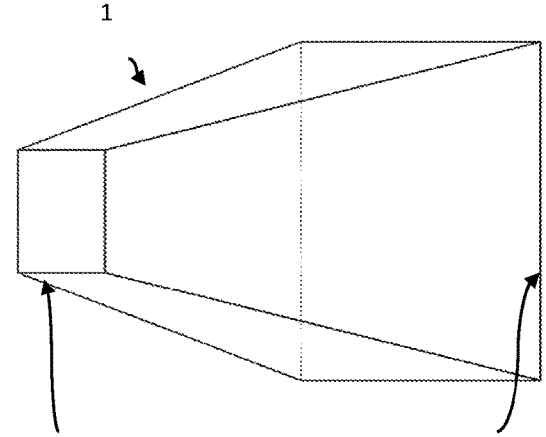
FIG. 23 shows a conversion body having the shape of a truncated tetrahedral pyramid.
Figure 24:
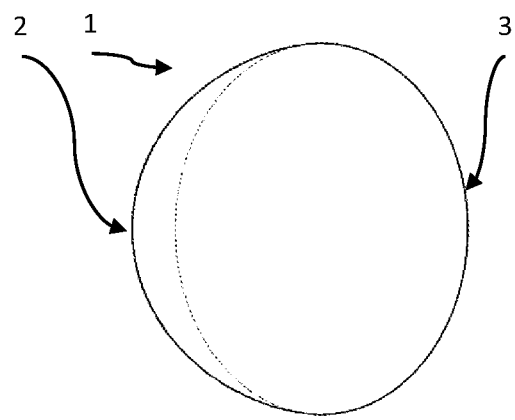
FIG. 24 shows a conversion solid having the shape of a spherical segment.
Figure 25:
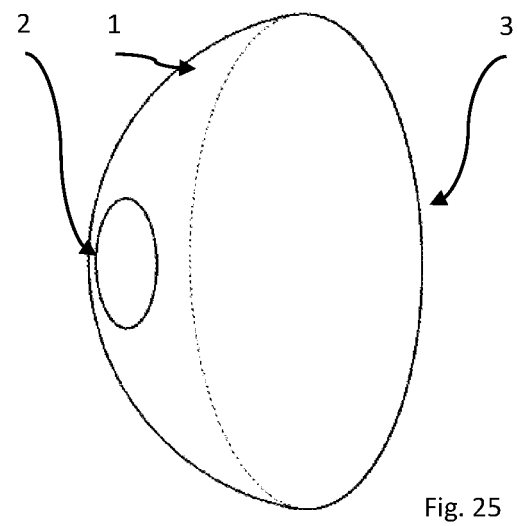
FIG. 25 shows a conversion body having the shape of a spherical layer.
Figure 26:
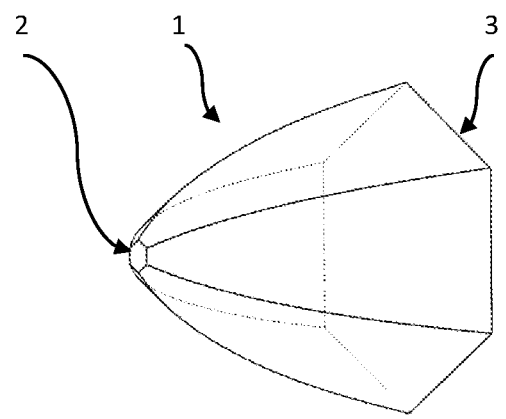
FIG. 26 shows a conversion body having the shape of a hexagonal parabolic concentrator.
Figure 27:
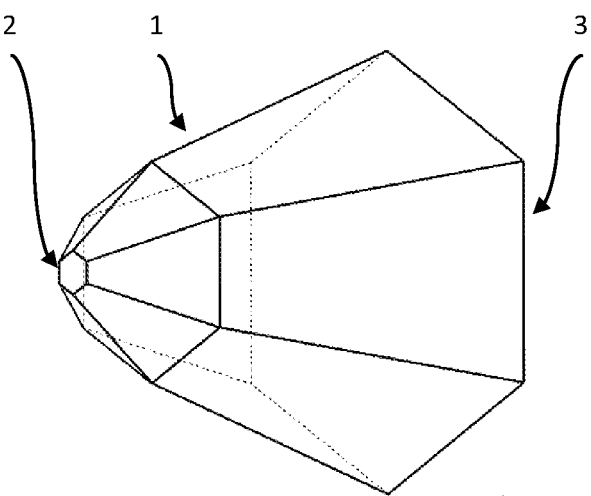
FIG. 27 shows a conversion body having the shape of a hexagonal truncated bipyramid.
Figure 28:
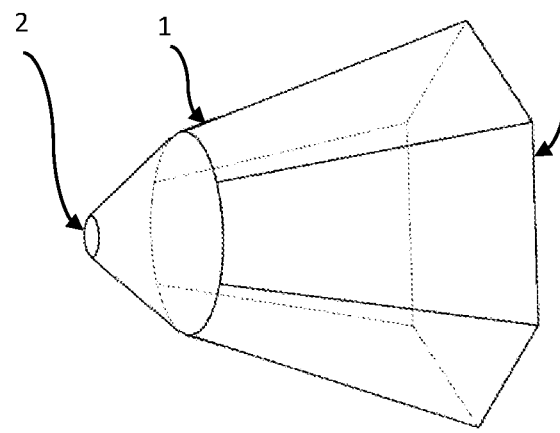
FIG. 28 shows a conversion body having the shape of a hexagonal truncated pyramid and a truncated cone.
Figure 29:
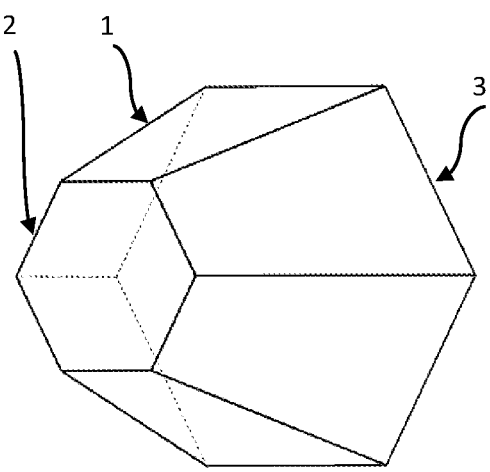
FIG. 29 shows a conversion body having the shape of a hexagonal truncated pyramid.
Figure 30:
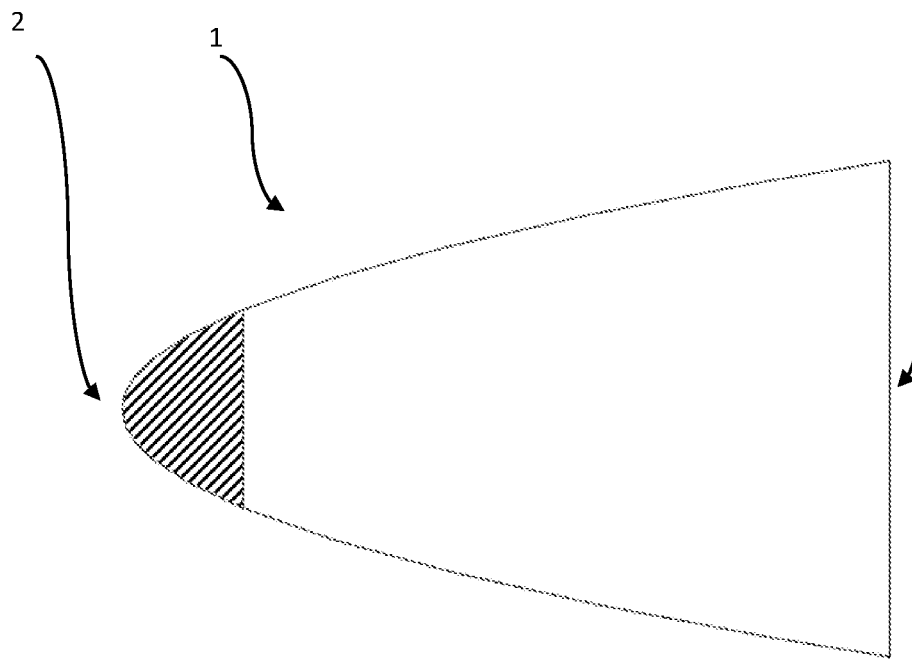
FIG. 30 shows a two-component conversion body having the shape of a component-paraboloid, in which the phosphor is second in order.
Figure 31:
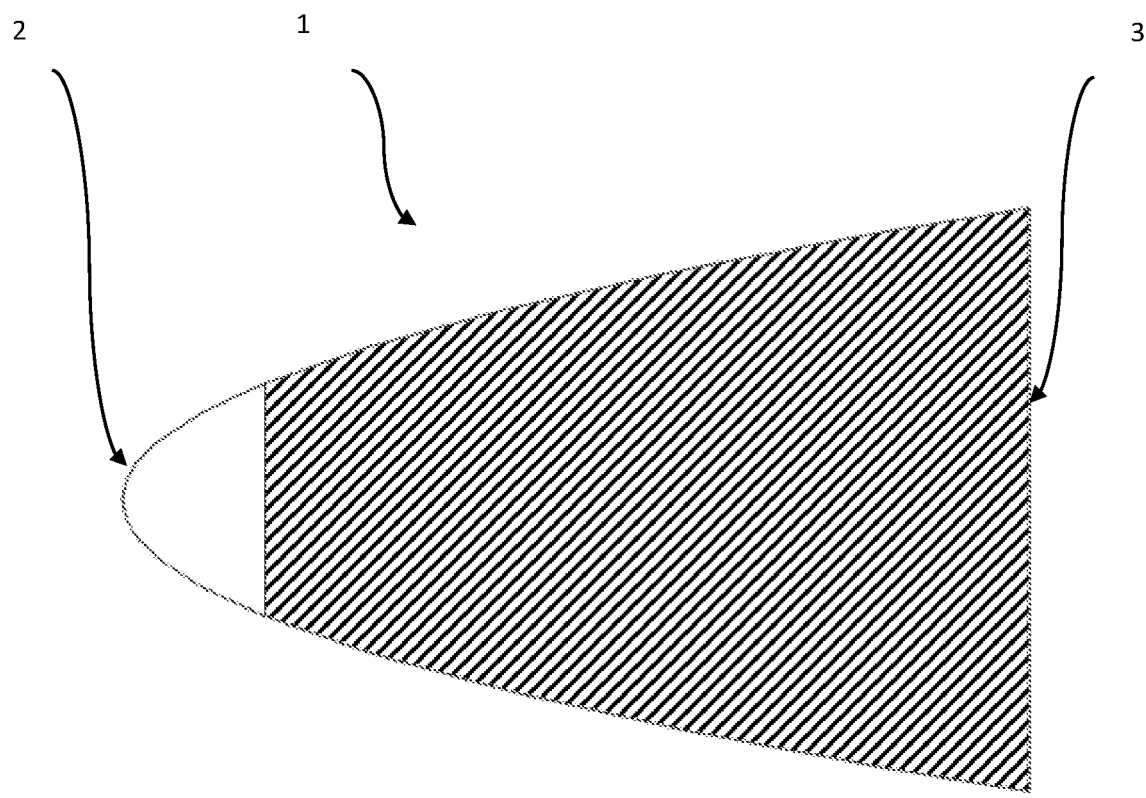
FIG. 31 shows a two-component conversion body having the shape of a component-paraboloid, in which the phosphor is first in order.
Figure 32:
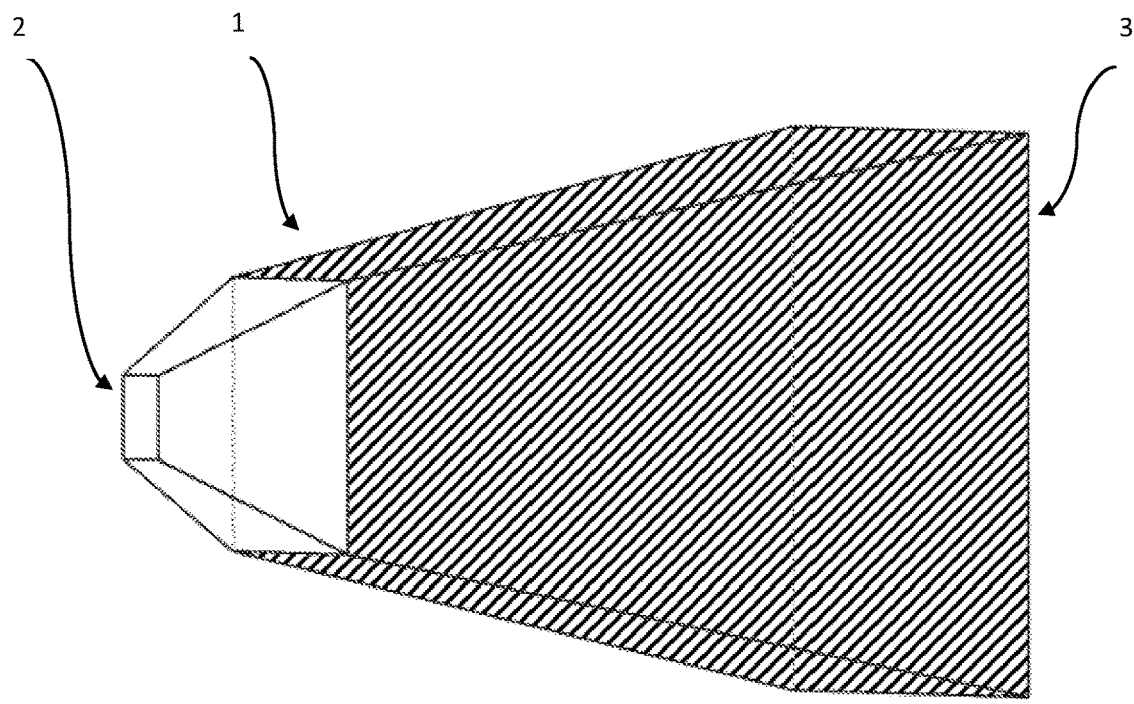
FIG. 32 shows a two-component conversion solid having the shape of a component—a truncated prism, in which the phosphor is first in order.
Figure 33:
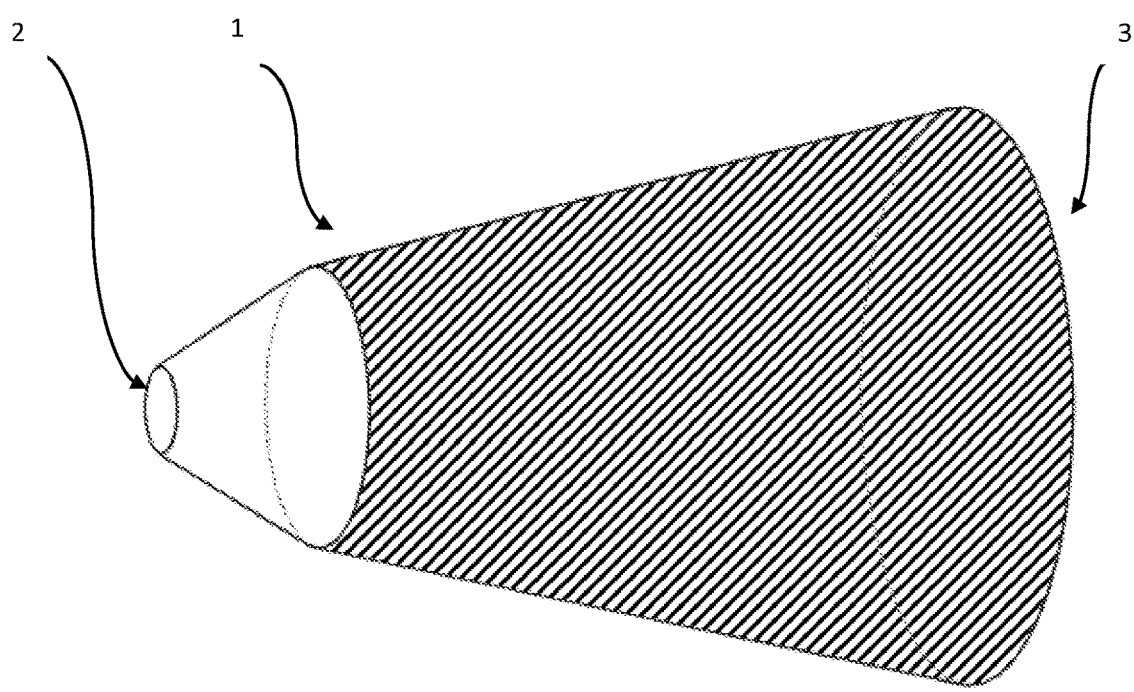
FIG. 33 shows a two-component conversion solid having the shape of a component—a truncated cone, in which the phosphor is first in order.

A heat sink 4 may be attached to the remaining surface of the conversion body 1. That is, the heat sink 4 does not shield the incident surface 2 or the exit surface 3. The heat sink 4 may be attached to the conversion body 1 by means of a thermally conductive material, for example by means of a solder, a thermally conductive adhesive or a thermally conductive paste. The heat sink 4 is for example metallic (aluminium, copper, other metal) or ceramic. An illustration of the heat sink 4 is shown in FIG. 4.

Suitable materials for the manufacture of the conversion body 1 are those in the group of garnets described by the formula $(Al\text{-}x,Bx)_3Al_5O_{12}{:}Ce$ or of the perovskite group $AAlO_3{:}Ti^{3+}$ where: A and B is at least one chemical element from the group Lu, Y, Gd, Tb and x takes a value between 0 and 1. Alternatively, a material of the composition $Al_2O_3{:}Ti^{3+}$. These materials are chosen by those skilled in the art mainly for their conversion properties (excitation and emission spectra, quantum efficiency), high refractive index, thermal conductivity, for their mechanical, thermal and physical properties, which means that the material is resistant to thermal stress, and is easy to machine, and is mechanically and chemically stable.

The conversion body 1 may be formed of two or more parts of different compositions joined together to form an integral unit functioning as an optical element. The parts are arranged in sequence along the direction of the optical axis, that is, light passes first through one and then through the other part of the conversion body 1. One part is made from phosphor material, the other part is made from non-phosphor material. The order of the two parts may be freely interchanged. While the task of the phosphor part is to convert light, the task of the non-converting part is to direct or homogenize the light beams. In addition, it is possible for the phosphor part to consist of two phosphor materials, e.g. to obtain light of a certain colour. The phosphor part may be smaller than the non-phosphor part. For example, the phosphor portion may be formed by two atomically bonded sheets, while the non-phosphor portion forms the remainder of the volume of the conversion body 1.

As for the shape of the conversion body 1 itself, the condition that the incident surface 2 is smaller than the exit surface 3 must be met. Since a portion of the light in the volume of the body 1 must be reflected in order to reach the exit surface 3 from the incident surface 2, the body 1 generally exhibits a shape of a spatially extending object in the direction from the incident surface 2 to the exit surface 3. Example shapes of the conversion body 1 are shown in FIGS. 5 to 33. Said exemplary shapes will be able to be modified by the skilled person, e.g. by changing the dimensions, increasing/decreasing the number of sides, combinations, etc.

Example 1—Parabolic Conversion Body 1

The primary light beam, which is a laser beam with a wavelength of 445 nm, enters the apex of the all-polished LuAG:Ce monocrystal conversion body 1 in the shape of a rotating paraboloid with a length of 6 mm, which represents the conversion body 1. The incident surface 2 on the apex of the body is defined by the cross-section of the primary radiation beam. The paraboloid itself has a focal length of 0.16 mm. All radiation from the laser is converted by the phosphor into broad spectrum green to yellow light with wavelengths of 470-680 nm. The radiation thus generated propagates randomly in all directions in the phosphor material, is subsequently collimated by total reflections at the interface between the conversion body 1 and the surrounding environment, and exits preferentially through the front planar face of the paraboloid forming the exit surface 3. Due to the high refractive index of the LuAG:Ce monocrystal (n=1.84), the area outside the incident surface 2 and the exit surface 3 behaves like a parabolic mirror—total reflection occurs here. The limiting angle of total reflection for the air-LuAG:Ce interface is 33° from the perpendicular to the interface, therefore any rays incident at a larger angle are reflected back into the phosphor. At the same time, for a parabolic mirror, all rays passing through its focus are collimated by it. Thus, if the focal length and the absorption rate of the primary radiation are suitably chosen so that a large portion of the secondary radiation originates at or near the focus, then most of this radiation leaves the conversion body 1 collimated.

At the same time, according to the above stated, the efficiency is the higher the more rays are produced in the focus of the conversion body 1. It is therefore obvious that the efficiency of the optical source with this conversion body 1 increases simultaneously with the reduction of the primary light beam.

Example 2—Conversion Body 1 in the Form of a Compound Parabolic Concentrator The 460 nm laser beam enters the all-polished YAG:Ce optical ceramic conversion body 1 in the form of a compound parabolic concentrator with an acceptance angle of 0° (i.e. with parallel optical axes of the parabolic surfaces), a focal length of 0.16 mm and an optical axis distance of 0.5 mm to the incident surface 2, which is at the focal level. All radiation from the laser is converted by the phosphor into broad spectrum green to yellow light with wavelengths of 505-700 nm. The radiation thus generated propagates randomly in all directions in the phosphor material, then, by means of total reflections at the interface, these rays are collimated and exit preferentially through the front plane face of the paraboloid forming the exit surface 3. For a compound parabolic concentrator, all rays entering it at an angle less than its acceptance angle are reflected into the area between the foci of the parabolas that define its shape. This is also true in reverse—the rays that originate in the focal plane are directed by the parabolic concentrator. Again, the high refractive index of YAG:Ce (n=1.82) applies here, as the efficiency of the parabolic concentrator increases with the refractive index of the environment that forms it.

Example 3—Conversion Body 1 for White Light

Conversion body 1—a phosphor in the shape of superimposed truncated cones is composed of two parts—a thin light converting plate made of YAG:Ce and of conical light guides made of undoped YAG. A 0.2 mm thick YAG:Ce plate is attached to the smaller flat surface of the smallest cone by diffusion bonding. The thickness of the converting part is determined so that at the exit the converted yellow light together with the rest of the penetrating blue primary light forms white light.

The primary light enters the conversion body 1 through the incident surface 2 via the entrance ground surface. The other surfaces are polished. The light produced by the conversion of the blue laser radiation in the thin plate converter enters the light guide where it is directed by total reflection from the outer crystal-air interface, collimated and exits preferentially through the front face forming the exit surface 3. The resulting white light has a correlated colour temperature (CCT) of 6 700 K.

Example 4—Conversion Solid 1 with a Spherical Cap

The conversion body 1—all-polished phosphor in the shape of a rotating paraboloid. The part between the top and the focus is made of undoped YAG monocrystal and helps to focus the laser beam of primary light into the focus. The primary light thus enters the second part from the light-converting single crystal GdYAG:Ce in a much smaller surface, thereby increasing the efficiency, as already explained in Example 1. The two parts of the conversion body 1 are bonded by a diffusion bonding method.

Example 5—Conversion Body 1 with High-Index Cap

Conversion body 1—all-polished phosphor composed of two parts. The phosphor part consists of a LuAG:Ce monocrystal in the shape of a truncated rotating paraboloid cut in the focal plane. The second part in front of the focal point consists of a hemisphere of cubic zirconia. The laser beam of primary light passes through this hemisphere and is focused into the focal point of the parabola, where it is converted to secondary light. Secondary light beams propagating in an undesired direction from the input incident surface 2 are retained due to the high refractive index of the cubic zirconia (typically 2.15) by total reflection within the conversion body 1 and reflected back in the desired direction to the exit surface 3.

Example 6—Conversion Body 1 in the Form of a Spherical Section with a Heat Sink Conversion body 1—a full-polished phosphor in the shape of a spherical section (part of an ellipsoid) is coated with a silver layer on the conical surface so that it can be permanently attached by soldering to the heat sink 4, which contains a conical hole of the corresponding size. The conical shape is preferably chosen because of the simplicity of manufacturing the conical holes. Due to the improved heat dissipation, it is possible to use a stronger excitation laser beam of primary light, which allows the construction of a more intense light source.

The heat sink 4 is preferably made of MN ceramic, which has a high thermal conductivity and thermal expansion similar to that of the single crystal of the conversion body 1, so as to avoid damage to the solder layer by thermal cycling.

The conversion body 1 can also be in the shape of a cone or a conical cone, but also in a more complex shape, since the heat sink 4 does not have to be machined, but for example sintered or cast.

Example 7—Fibre Application

A coloured light source for fibre applications consisting of a laser diode, a conversion body 1 in the form of a compound spherical section and a truncated cone and a copper holder which also serves as a heat sink 4 for heat dissipation. However, if higher efficiency is desired, a collimating optic can be placed between the laser diode and the conversion body 1. The light from the conversion body 1 forms a converging cone of light which is most focused at a distance of 2.7 mm from the exit surface 3 of the conversion body 1. When measured with a collimating lens, an optical efficiency of 32% was measured for the conversion of primary blue light to secondary yellow-green light.

Example 8—Conversion Body 1 with Two Phosphor Materials

Conversion body 1—all-polished phosphor consisting of three parts connected into a single body. LuAG:Ce, converting blue radiation to green, titanium-doped sapphire $Al_2O_3$: $Ti^{3+}$, converting green radiation further to red and near-infrared, and undoped sapphire or glass, directing the resulting light in the desired direction. The first part of the body 1 is in the shape of a rotating paraboloid or truncated cone, the second and third parts are in the shape of a truncated cone or comolic rotating paraboloid.

Example 9—Conversion Body 1 with Two Phosphor Materials

Conversion body 1—all-polished phosphor consisting of two parts consisting of one of the group of materials BAM:Eu/SAM:Eu/(LY)SO:Ce, converting UV radiation to blue, and YAG:Ce, converting blue radiation partly to yellow to green, so that the resulting composite light is white. The first part of the conversion body 1 is in the shape of a rotating paraboloid or coma cone, the second part is in the shape of a low cylinder or coma cone.

Example 10—Anti-Reflective Layer on the Incident Surface 2

The incident surface 2 of the conversion body 1 is coated with an anti-reflective layer optimized for the spectral region 400-470 nm, i.e. for the wavelengths of the primary radiation.

Example 11—Dichroic Layer on Incident Surface 2

The incident surface 2 of the conversion body 1 is coated with a dichroic anti-reflective layer which transmits excitation light in the region 430-470 nm into the body 1 and at the same time acts as a highly reflective layer for secondary light (with a wavelength>490 nm) produced by intrinsic luminescence in the conversion body 1.

Example 12—Anti-Reflective and Highly Reflective Layer on Exit Surface 3

The exit surface 3 is coated with an anti-reflective layer for the 500-700 nm wavelength range, which allows more light to be extracted from the conversion body 1. At the same time, this thin layer can act as a highly reflective layer for radiation in the wavelength range 400-470 nm, thereby eliminating the presence of primary radiation in the resulting light beam. Again, this increases the overall efficiency of the device.

Example 13—Dichroic Layer on the Exit Surface 3

The conversion body 1 is equipped with a dichroic layer on the exit surface 3—an optical filter that transmits only the desired part of the light spectrum. This makes it unnecessary to use a separate optical filter, the use of which would lead to an increase in the resulting light source and a decrease in efficiency due to interface losses. The conversion body 1 thus modified has a narrower emission spectral characteristic.

Example 14—Defined Micro or Nano Structure

To further increase the efficiency, the exit surface 3 of the conversion body 1 is provided with a nano or micro structure with a defined profile and a periodicity of less than 3 um, which increases the amount of light exiting the component. This structure may also serve to further direct the light beams and possibly exploit the phenomenon of diffraction or holographic optics. Other secondary optics components may also have a similar structure. Similarly, the incident surface 2 may be structured for better penetration of the primary light into the conversion body 1.

Example 15—Brewster's Angle

The entrance surface 2 of the conversion body 1 is bevelled at an angle of 61.5°, which corresponds to the Brewster's angle for a material with a refractive index of 1.845 @450 nm. As a result, there is no loss due to reflection of radiation on this incident surface 2 and the overall efficiency of radiation binding to the single crystal component of the conversion body 1 is increased.

Example 16—Polarizing Beam Combiner (PBC)

The compact light source consists of two 3.5 W laser diodes with an emission wavelength of 445 nm, whose primary light output beams are first collimated and then coupled using a half-wave plate and a polarizing beam combiner.

Example 17—One Diode

The simple and compact light source uses a high-power diode with an optical power of 6 W. The primary laser beam from the diode is focused by a collimating lens on the input surface 2 of the conversion body 1, the diameter of the laser beam at the input is less than 200 µm.

Example 18—Multiple Diodes in Space

The powerful light source uses an array of laser diodes whose output laser beams, after collimation, are directed to the centre of the incident surface 2 of the conversion body 1, which is coated with an anti-reflective layer. The primary beams from these laser diodes may be coupled by, for example, a polarization combiner or a dichroic sharp-edge filter, if the wavelength of the primary beams differs.

Example 19—Multiple Diodes in Space+Brewster Angle

The powerful light source uses an array of several laser diodes whose output laser beams, after collimation, are directed onto the incident surface 2 of the conversion body 1 at Brewster's angle, which for a material with a refractive index of 1.845 @450 nm corresponds to 61.5°. This arrangement minimizes reflection losses at the interface of the two optical media.

Example 20—Multiple Light Source

The light source comprises an ordered array of conversion bodies 1 and associated primary light sources. exit surfaces 3 of the conversion bodies 1 are oriented in the light source in a common direction for a strong light source.

Example 21—Glass Slide

Figure 34:
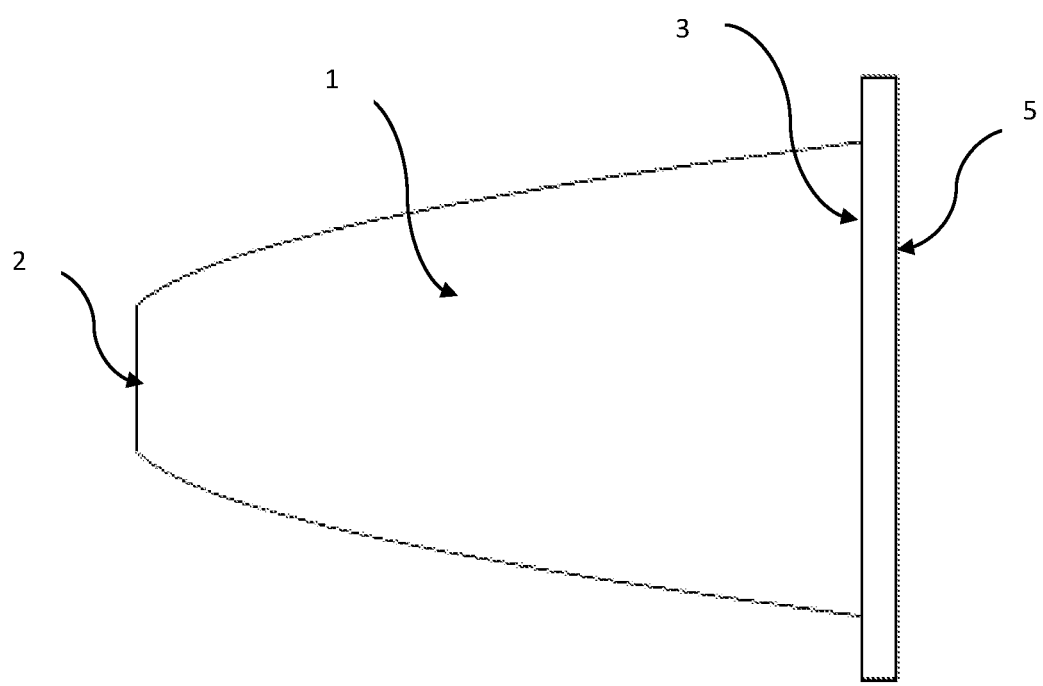
FIG. 34 shows a conversion body with a fixing slide on the exit face of the conversion body.

The conversion body 1 is mechanically held in the holder by a glass slide 5 located on the exit surface 3 and serving as a rim (see FIG. 34). This glass slide 5 may also be provided with a mask or layers as in Example 11, or analogously as in Example 12, or a functional nano-structure as in Example 14. The glass slide 5 is bonded to the conversion body 1 by an optical adhesive with a suitable refractive index, for example an optical silicone with a refractive index of 1,5.

This arrangement only slightly degrades the overall efficiency of the light source. It does, however, simplify the mounting of the conversion body 1 in the light source and allows greater flexibility in manufacturing.

Example 22—Lens

The conversion body 1 is mechanically held in the holder by a plano-convex lens—a coupler—located on the exit surface 3. The lens is bonded to the conversion body 1 by an optical adhesive with a suitable refractive index, e.g. optical silicone with a refractive index of 1.5.

This arrangement helps to further reduce the divergence of the exiting light beam so that the divergence angle of the beam is lower. Alternatively, it allows the output radiation to be collimated to the extent that the radiation is focused into a beam focus with a very high power density.

Example 23—Light Guide

A glass light guide is connected to the exit surface 3 of the conversion body 1. Advantageously, bonding with optical silicone is used to minimize interface losses. A combination with a glass slide according to Example 21 is also possible. Due to the low divergence of the light exiting from the conversion body 1, the efficiency of the coupling of the light into the light guide is more than 40%, which is more than is achieved from LED sources of similar parameters.

The exit side of the light guide has a shape optimized to bind radiation advantageous for the target application of the light source—the entrance slit of the sample space or the lighting system. Due to the mixing of the beams by reflections on the sides of the light guide, the slit is illuminated with increased spatial and colour homogeneity.

Example 24—Supplementary Red Source

A light source based on Example 3 is used, where a beam of primary blue light is supplemented by a dichroic filter with red light of 620 nm or higher (or infrared supplementary light)—a beam of red laser light from a laser diode. Due to the common optical path and additional mixing in the non-converting waveguide part as described in Example 3, the red and blue components have similar angular characteristics, i.e. the resulting mix of all three colour components (primary blue residue, green-yellow luminescence and secondary red) is a homogeneous white light, due to the presence of the red component of the spectrum with better colour rendering than in Example 3.

INDUSTRIAL APPLICABILITY

The light source according to the invention finds application in the lighting industry, scientific applications and instruments, flashlights and headlamps, instrument vision, laboratory equipment, and in the automotive industry.

The invention claimed is:

1. A light source, for emitting collimated or focused light, the light source comprising: at least one primary light source and a conversion body (1) formed at least in part of a single crystal phosphor material for converting primary light to secondary light, wherein the single crystal phosphor material has on its surface an incident surface (2) for primary light and an exit surface (3) of the secondary light, wherein the remaining surface of the single crystal phosphor material except the incident surface (2) and the exit surface (3) forms a shaped reflective interface for directing the light by reflection inside the conversion body (1) towards the exit surface (3) wherein the conversion body (1) has a shape of a spatially extending object with an extension in the direction from the incident surface (2) to the exit surface (3) so that the incident surface (2) and the exit surface (3) are spaced apart from each other, wherein the area of the incident surface (2) is less than the area of the exit surface (3), and wherein the single crystal phosphor material is adapted for full conversion of blue primary light into the secondary light with broad spectrum green to yellow light with wavelengths in a range between 470 and 680 nanometers.

2. The source according to claim 1, wherein the remaining surface of the single crystal phosphor material is provided with a reflective layer.

3. The source according to claim 1, wherein the size of the incident surface (2) is less than 2 mm 2.

4. The source according to claim 1, wherein the conversion body (1) as a whole is simultaneously formed of at least two parts, wherein the at least two parts are arranged in a row behind each other along the direction of the optical axis of the conversion body (1) in any order, wherein at least one part is formed by a single crystal phosphor material for full conversion of primary light, and the remaining part, or parts, are formed by a non-phosphor material for directing or homogenizing the light.

5. The source according to claim 1, wherein the conversion body (1) comprises at least two phosphor materials.

6. The source according to claim 4, wherein the single crystal phosphor material of the conversion body (1) is from the group of garnets described by the formula $(A1\text{-}x,Bx)_3Al_5O_{12}:Ce^{3+}$, or from the group of perovskites $AAlO_3:Ti^{3+}$, wherein: A and B is at least one chemical element from the group Lu, Y, Gd, Mg, Tb and x takes a range between 0 and 1, or of the composition $Al_2O_3:Ti^{3+}$.

7. The source according to claim 1, wherein the source comprises a heat sink (4) having a heat transfer surface adjacent to at least a portion of the surface of the conversion body (1) outside the at least one incident surface (2) and the at least one exit surface (3).

8. The source according to claim 7, wherein the conversion body (1) and the heat sink (4) are connected by a heat conductive material.

9. The source according to claim 1, wherein the primary light source is adapted to generate low divergence primary light.

10. The source according to claim 1, wherein the at least one conversion body (1) has a shape from the group consisting of: an elliptical paraboloid, a truncated elliptical paraboloid, a portion of an ellipsoid, a compound parabolic concentrator, a compound elliptical concentrator, a pyramid, a truncated pyramid, a cone, a truncated cone, a truncated prism, compound shapes formed by a combination thereof, compound shapes formed by a combination thereof with a prism or a cylinder, or with a spherical segment.

11. The source according to claim 1, wherein a glass slide (5) or a lens or other optical element from the group consisting of a Fresnel lens, a holographic optics, a light guide input or a light guide fiber input is connected to the exit surface (3) of the conversion body (1).

* * * * *